United States Patent
Bosga et al.

(10) Patent No.: US 9,673,739 B2
(45) Date of Patent: Jun. 6, 2017

(54) MACHINE TYPE IDENTIFICATION

(75) Inventors: Sjoerd Bosga, Västerås (SE); Freddy Magnussen, Vasteras (SE); Heinz Lendenmann, Västerås (SE); Rahul Kanchan, Vasteras (SE); Reza Moghaddam Rajabi, Vasteras (SE)

(73) Assignee: ABB Research Ltd., Zurich (CH)

( * ) Notice: Subject to any disclaimer, the term of this patent is extended or adjusted under 35 U.S.C. 154(b) by 869 days.

(21) Appl. No.: 13/458,136

(22) Filed: Apr. 27, 2012

(65) Prior Publication Data
US 2012/0216630 A1    Aug. 30, 2012

Related U.S. Application Data

(63) Continuation of application No. PCT/EP2009/064588, filed on Nov. 4, 2009.

(51) Int. Cl.
| | |
|---|---|
| H02P 23/12 | (2006.01) |
| H02P 6/22 | (2006.01) |
| H02P 23/14 | (2006.01) |
| H02P 25/08 | (2016.01) |
| H02P 6/30 | (2016.01) |

(52) U.S. Cl.
CPC ............... *H02P 6/22* (2013.01); *H02P 6/30* (2016.02); *H02P 23/14* (2013.01); *H02P 25/08* (2013.01)

(58) Field of Classification Search
USPC ......... 318/565, 47, 559, 560, 705, 727, 561, 318/400.14, 70; 701/62; 434/224; 702/182, 183; 324/207.22
See application file for complete search history.

(56) References Cited

U.S. PATENT DOCUMENTS

| | | | |
|---|---|---|---|
| 3,911,339 A | 10/1975 | Rettig | |
| 4,497,630 A * | 2/1985 | Oliver | 434/224 |
| 6,570,358 B2 * | 5/2003 | Nakatsugawa et al. | 318/727 |
| 2007/0255471 A1 * | 11/2007 | Wallis et al. | 701/62 |
| 2008/0074070 A1 * | 3/2008 | Kumar et al. | 318/561 |

FOREIGN PATENT DOCUMENTS

| | | |
|---|---|---|
| CN | 1389978 A | 1/2003 |
| EP | 1257049 A2 | 11/2002 |
| JP | 11055991 A * | 2/1999 |

OTHER PUBLICATIONS

International Search Report and Written Opinion of the International Searching Authority; Application No. PCT/EP2009/064588; Issued: Aug. 19, 2010; Mailing Date: Aug. 27, 2010; 12 pages.

* cited by examiner

*Primary Examiner* — Jorge L Carrasquillo
(74) *Attorney, Agent, or Firm* — Whitmyer IP Group LLC

(57) ABSTRACT

For identifying the machine type of an alternating current machine, a direct current is first applied to the stator for aligning the d-axis of the rotor and the magnetic field direction of the stator. Secondly, a direct current is applied to the stator at a current angle which causes the rotors of a permanent magnet machine and a synchronous reluctance machine to exert torque in different directions. The torque direction of the rotor is detected and the machine type is identified based on the torque direction information. The machine type is recognized as a permanent magnet machine or a synchronous reluctance machine depending on the torque direction. If no torque is detected, then the machine type is recognized as an induction machine.

12 Claims, 2 Drawing Sheets

MACHINE TYPE IDENTIFICATION

CROSS-REFERENCE TO RELATED APPLICATIONS

The present Application is a continuation of pending International Patent Application PCT/EP2009/064588, filed on Nov. 4, 2009, which designates the United States and the content of which is incorporated herein by reference.

FIELD OF THE INVENTION

The present invention relates to a method and a device for identifying the type of an alternating current (AC) machine. The identification is based on torque direction information detected from the rotor.

BACKGROUND OF THE INVENTION

There exists a plurality of different types of alternating current (AC) machines including induction machines (IM) and synchronous machines. The synchronous machines further comprise synchronous reluctance machines (SynRM) and permanent magnet machines (PM). For each AC motor type there is an appropriate control scheme according to which a motor controller drives the AC motor. The operator must know what kind of AC motor is connected so that he can select an appropriate control scheme. However, it can be difficult for the operator to identify the type of the motor because the appearance of the different types of AC motors can be very similar.

US 2008/0074070 discloses a method for autonomously identifying a type of a motor based on a characteristic value of the motor. A characteristic value of the motor is measured and compared to a known characteristic value. The type of the motor is identified based on the comparison. For example, two traction motors with different windings may be identified on the basis of their turning direction when the motors are excited with a phase sequence that causes the motors to turn in opposite directions.

JP11055991 discloses a SynRM with means for detecting a rotor position, and a method for driving the SynRM with help of the position information.

U.S. Pat. No. 6,570,358 B2 discloses an AC motor control apparatus having a machine type identification means with which the type of the connected machine is identified. The machine type is identified by measuring the inductance of the direct axis (d-axis) and the inductance of the quadrature axis (q-axis) which is orthogonal to the d-axis and has advanced by 90° in electrical angle. The identification is based on the relationship in magnitude between the measured inductances of the d-axis and q-axis. The control of AC motors according to motor control schemes is also disclosed.

However, the above-mentioned method for machine type identification is complicated to implement. Thus, there is a need for methods which can identify the AC machine type in a simple and uncomplicated manner.

SUMMARY OF THE INVENTION

One object of the present invention is thus to provide an improved machine type identification method for an AC machine. A further object of the present invention is to provide an improved device for a machine type identification of an AC machine.

These objects are achieved by a method and a device according to the appended claims.

The invention is based on the realization that different types of rotors exert a torque in different directions at certain current angle values, and by detecting the torque direction the respective machine type can be recognized.

According to a first aspect of the invention, there is provided a method for a machine type identification of an AC machine comprising a stator and a rotor, the method comprising the steps of applying a current comprising a DC component to the stator, detecting torque direction information or rotation information, and identifying the machine type based on the torque direction information or the rotation information. These method steps provide a simple method for identifying whether the machine is IM since it is the only machine type that does not exert torque when the current is applied.

According to one embodiment of the invention, the method comprises the steps of applying a current comprising a DC component to the stator at a current angle θ which causes the rotors of a PM and a SynRM to exert torque in different directions or to rotate over different angles, detecting a torque direction or a rotation angle of the rotor, and identifying the machine type based on the torque direction information or the rotation angle information. These method steps provide a simple method for distinguishing between IM, SynRM and PM.

According to one embodiment of the invention, the method comprises the steps of applying a current comprising a DC component to the stator to thereby obtain a magnetic field direction, aligning a d-axis of the rotor and the magnetic field direction such that they coincide. By first aligning the rotor in a known direction a reference direction is acquired which is necessary for applying the method for machines where the absolute rotor position is not known.

According to one embodiment of the invention, the d-axis of the rotor and the magnetic field direction are aligned by letting the rotor to rotate to a balance point. This method step is applicable and preferable when the rotation of the rotor during the machine type identification is allowed.

According to one embodiment of the invention, the d-axis of the rotor and the magnetic field direction are aligned by changing the direction of the magnetic field direction until a balance point is found. One is reduced to take this method step when the rotation of the rotor during the machine type identification is not allowed.

According to one embodiment of the invention, the d-axis of the rotor and the magnetic field direction are aligned with help of a rotor position information from an absolute position sensor. This method step is applicable and preferable when the machine comprises an absolute position sensor.

According to one embodiment of the invention, the current angle θ has an absolute value between 90° and 180°, such as between 100° and 140°, such as between 110° and 130°. While the method theoretically works with any current angle θ between 90° and 180°, the use of current angle θ between 110° and 130° is preferable since at this current angle θ a relatively high torque is exerted both in typical SynRM and in typical PM machines.

According to one embodiment of the invention, the method comprises the step of identifying the machine as a PM if the torque direction is equal to the direction of the current angle θ or the rotation angle is equal to the current angle θ. This method step provides a simple method for identifying the machine as a PM.

According to one embodiment of the invention, the method comprises the step of identifying the machine as a SynRM if the torque direction is opposite to the direction of the current angle θ or the rotation angle is equal to 180°-θ. This method step provides a simple method for identifying the machine as a SynRM.

According to one embodiment of the invention, the method comprises the step of identifying the machine as an IM if no torque or no rotation is detected. This method step provides a simple method for identifying the machine as an IM.

According to a second aspect of the invention, there is provided a device for a machine type identification of an AC machine comprising a stator and a rotor, the device comprising a DC means for applying a current comprising a DC component to the stator at a plurality of current angles θ, detections means for detecting a torque direction or rotation angle of the rotor, and a control unit configured to control the DC means, wherein the control unit is configured to perform the steps of any of the claims 1 to 12. By these measures a simple device for a machine type identification of an AC machine is provided.

BRIEF DESCRIPTION OF THE DRAWINGS

The invention will be explained in greater detail with reference to the accompanying drawings, wherein.

DETAILED DESCRIPTION OF THE INVENTION

Figure 1A:
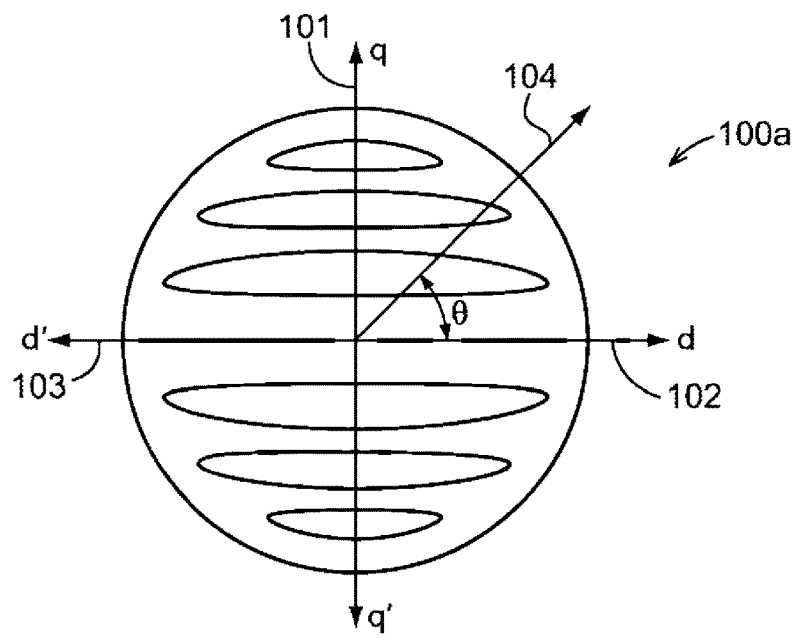
FIG. 1a shows a rotor of a SynRM with d-axes, q-axes and a current angle θ illustrated.
Figure 1B:
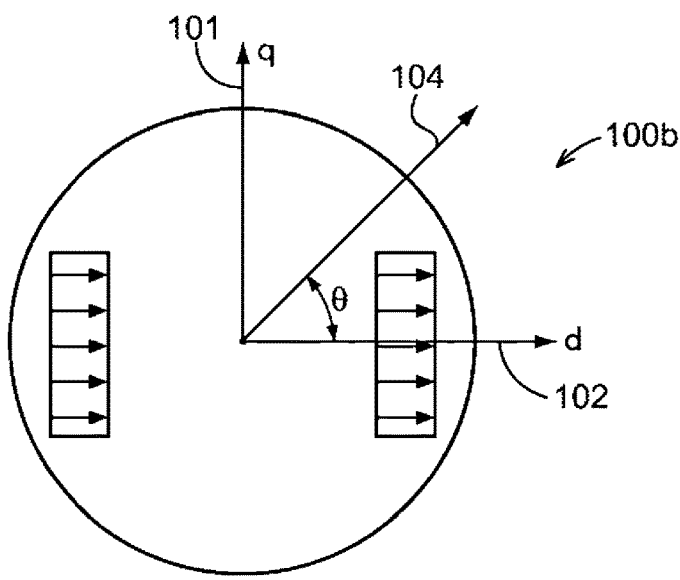
FIG. 1b shows a rotor of a PM with a d-axis, a q-axis and a current angle θ illustrated.

Referring to FIG. 1, a cross-sectional view of a SynRM rotor 100a is shown in FIG. 1a and the same of a PM rotor 100b is shown in FIG. 1b. Both rotors 100a, 100b have two poles and they are therefore compatible with a two-pole stator. For each of the rotors 100a, 100b there is defined a q-axis 101 and a d-axis 102, the rotors 100a, 100b attempting to align their d-axes 102 with a magnetic field direction 104 of the stator. A current angle θ is defined between the magnetic field direction 104 and the d-axis 102. As is known for a person skilled in the art, in the context of electrical machines the mentioned angles mean electrical angles, each pole covering an electrical angle of 180°. The electrical angle between the q-axis 101 and the d-axis 102 is always 90° despite of the pole number. For a two-pole rotor the electrical angle and the physical angle are the same.

An important difference between the two rotors 100a, 100b is that the SynRM rotor 100a is symmetrical about the q-axis 101 while the PM rotor 100b is not. Therefore, the SynRM rotor 100a has an additional d'-axis 103 which is functionally equal with the d-axis 102. The SynRM rotor 100a attempts to align any of the d- and d'-axes 102, 103 with the magnetic field direction 104, and thereby the SynRM rotor 100a has two balance points while the PM rotor 100b only has one.

Imagine that the rotors 100a and 100b are initially at rest and a magnetic field is applied at an arbitrary direction 104. When the current angle θ has an absolute value between 0° and 90° the both rotors 100a, 100b behave the same i.e. they attempt to rotate in the same direction. However, when the current angle θ has an absolute value between 90° and 180° the two rotors 100a, 100b attempt to rotate in opposite directions (rotor 100a clockwise and rotor 100b counter clockwise). Consequently, depending on the direction of the exerted torque the type of the rotor 100a, 100b can be recognized.

Figure 2:
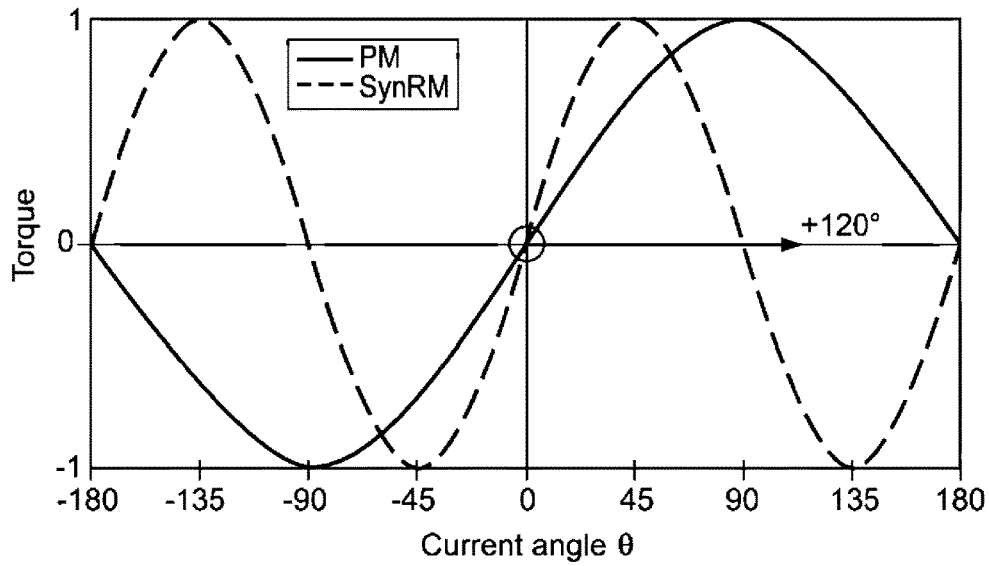
FIG. 2 is a diagram showing torque as a function of current angle θ for SynRM and PM.

The previously explained difference between the two types of rotors is further illustrated in FIG. 2 which shows the torque as a function of current angle θ for SynRM and PM.

Figure 3:
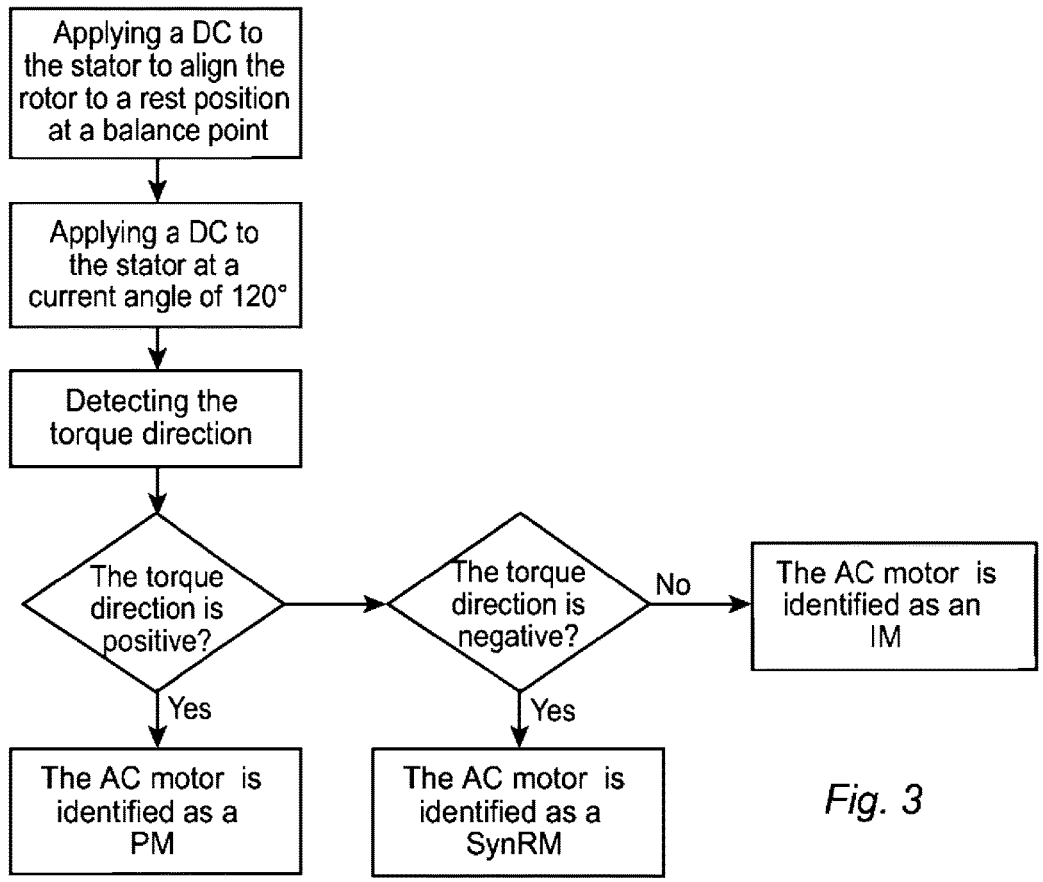
FIG. 3 is a flow chart illustrating a method according to one embodiment of the invention.

Referring to FIG. 3, in a method according to one embodiment of the invention a DC is first applied to the stator in an arbitrary direction. The rotor aligns itself to a rest position at a balance point where the torque is zero. Next, a DC is applied to the stator at a current angle of 120° which causes the rotors of a PM and a SynRM to exert torque in different directions. The direction of the exerted torque is detected and the machine type can be recognized on the basis of the torque direction information. If the torque direction is positive i.e. same as the direction of the current angle θ, then the machine is identified as a PM. If the torque direction is negative, then the machine is identified as a SynRM. If no torque is detected, then the machine is identified as an IM.

It is not necessary to detect the direction of the exerted torque in order to recognize the machine type. The machine type can also be recognized by detecting the angle over which the rotor rotates. A PM motor always rotates over an angle equal to the current angle value, while SynRM rotates over an angle 180°-θ with current angle values between 90° and 180°. An IM always remains stationary regardless the current angle value. For determining the machine type, a DC is applied to the stator at a current angle of 120° which causes the rotors of a PM and a SynRM to rotate over different angles. If the rotation angle is equal to the applied current angle 120°, then the machine is identified as a PM. If the rotation angle is equal to 180°-120°=60°, then the machine is identified as a SynRM. If no rotation is detected, then the machine is identified as an IM.

For exerting an opposite torque on the rotors of a PM and a SynRM any current angle value between 90° and 180° can be used, but 120° is a preferred value since it exerts a high torque (in relation to the maximum torque) on both types of rotors as can be verified in FIG. 2. In deed, an appropriate current angle value may also be negative such as between −90° and −180°, or it may have any value corresponding to the second and third quadrants of FIG. 1, such as between 180° and 270°, between 450° and 540°, etc.

In some applications it is not allowed or not possible to let the rotor rotate during the machine type identification. The method according to FIG. 3 has to be modified somewhat in order to be able to recognize the machine type without significant rotation. The modified method still needs to begin with the alignment of the rotor to a rest position at a balance point. Instead of rotating the rotor, however, the magnetic field direction is changed until a direction is found which does not exert a torque. This trial and error sequence may be carried out as follows. A DC current is applied to the stator at an initial current angle with an initial amplitude close to zero. The amplitude of the DC current is gradually increased until a torque or motion of the rotor is detected. The obtained torque is countered by applying a current in an opposite direction to prevent any significant movement of the rotor. The procedure is repeated with a different current angle until a balance point with zero torque is found. The rest of the method follows the flow chart of FIG. 3 with the difference that the amplitude of the DC current at the current angle 120° is also increased gradually and decreased or controlled to an opposite direction as soon as torque or motion is detected to prevent any significant movement of the rotor.

It is to be noted that when a motor comes with a factory calibrated absolute position sensor the balance point of the rotor is known and there is no need to carry out the method step of aligning the rotor to a rest position.

Figure 4:
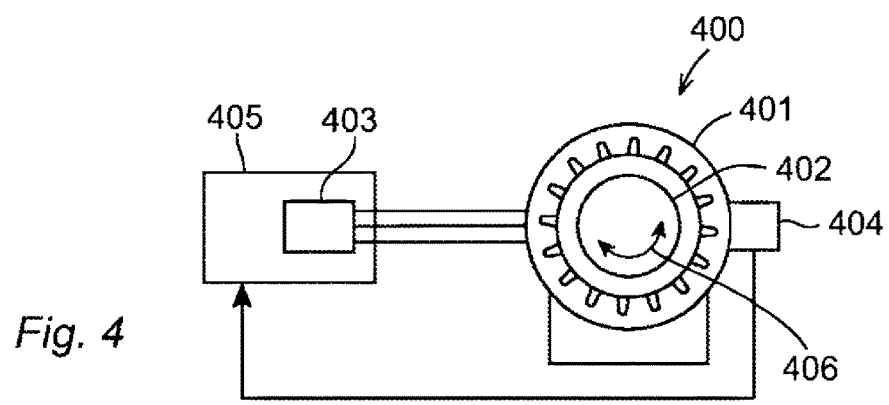
FIG. 4 is a block diagram illustrating an apparatus according to one embodiment of the invention.

FIG. 4 schematically shows a device according to one embodiment of the invention. An AC motor 400, which can be of the type IM, PM or SynRM, comprises a stator 401 and a rotor 402 rotatable in relation to the stator 401, and is designed in accordance with conventional art. A control unit 405 which is adapted to supply multiple-phase power is connected to the AC motor 400. Since different types of AC motors 400 shall be controlled in different ways, the control unit 405 needs to be configured to drive and control a specific AC motor 400 according to a specific control scheme associated with that AC motor type. In order to be able to choose the right control scheme, the control unit 405 needs the motor type information.

The control unit 405 comprises DC means 403 for applying a DC to the AC motor 400 at a plurality of current angles θ. The DC means 403 per se can be designed in various ways known to the person skilled in the art.

Detections means 404 are provided for detecting the torque direction 406 of the rotor 402. The detections means 404 can be in the form of any suitable sensor such as a position sensor, a movement detector, a torque sensor or a speed sensor. The detection of the torque direction or rotation may also be accomplished without any of these sensors. The detection can for example be based on determining the rotor position by tracking the axis of maximum reluctance. This is done by injecting to the stator a current or voltage in addition to the fundamental current, and by measuring the voltage or current response of the motor. This method is well known from the literature and therefore known to a person skilled in the art.

For automatically obtaining the motor type information, the control unit 405 is configured to perform the steps of the machine type identification methods disclosed above. The control unit 405 can be designed in various ways known to the person skilled in the art.

The invention is not limited to the embodiments shown above, but the person skilled in the art may, of course, modify them in a plurality of ways within the scope of the invention as defined by the claims. Especially, the current applied to the stator does not need to be pure DC but it can be any current, such as AC, comprising a DC component. Moreover, although rotors are mentioned as part of the machines throughout the description, the disclosed method applies mutatis mutandis to linear motors.

In addition to the alternating current machine types mentioned in the above disclosure the PM machines can further be divided into interior permanent magnet machines (IPM) and surface permanent magnet machines (SPM). To that there also exists permanent magnet assisted synchronous reluctance machines (PMaSynRM). Although the described method does not fit for distinguishing between different types of PM machines, the described method can be supplemented with other methods for distinguishing even between IPM, SPM and PMaSynRM.

What is claimed is:

1. A method for a machine type identification of an AC machine comprising a stator and a rotor, the method comprising the steps of:
   applying a current comprising a DC component to the stator at a current angle which causes the rotor to exert torque in a first direction or rotate over a first angle if the AC machine is a PM or to exert torque in a second direction or rotate over a second angle if the AC machine is a SynRM, the first direction being different from the second direction, the first angle being different from the second angle;
   detecting a torque direction or a rotation angle of the rotor; and
   identifying the machine type based on the torque direction information or the rotation angle information.

2. The method according to claim 1, wherein the method comprises the steps of:
   applying another current comprising another DC component to the stator to thereby obtain a magnetic field direction;
   aligning a d-axis of the rotor and the magnetic field direction such that the d-axis of the rotor and the magnetic field direction coincide.

3. The method according to claim 2, wherein the d-axis of the rotor and the magnetic field direction are aligned by letting the rotor to rotate to a balance point.

4. The method according to claim 2, wherein the d-axis of the rotor and the magnetic field direction are aligned by changing the direction of the magnetic field direction until a balance point is found.

5. The method according to claim 2, wherein the d-axis of the rotor and the magnetic field direction are aligned with help of a rotor position information from an absolute position sensor.

6. The method according to claim 1, wherein the current angle has an absolute value between 90° and 180°.

7. The method according to claim 1, wherein the current angle has an absolute value between 100° and 140°.

8. The method according to claim 1, wherein the current angle has an absolute value between 110° and 130°.

9. The method according to claim 1, wherein the method comprises the step of identifying the machine as a PM if the torque direction is equal to a direction of the current angle or the rotation angle is equal to the current angle.

10. The method according to claim 1, wherein the method comprises the step of identifying the machine as a SynRM if the torque direction is opposite to the direction of the current angle or the rotation angle is equal to 180° minus the current angle.

11. The method according to claim 1, wherein the method comprises the step of identifying the machine as an IM if no torque or no rotation is detected.

12. A device for a machine type identification of an AC machine comprising a stator and a rotor, the device comprising:
    a DC means configured to apply a current comprising a DC component to the stator,
    detections means configured to detect a torque direction or rotation angle of the rotor, and
    a control unit configured to control the DC means,
    characterized in that the control unit is configured to perform the steps of:
    controlling the DC means to apply the current comprising the DC component to the stator at a current angle which causes the rotor to exert torque in a first direction or rotate over a first angle if the AC machine is a PM or to exert torque in a second direction or rotate over a second angle if the AC machine is a SynRM, the first direction being different from the second direction, the first angle being different from the second angle;
    detecting a torque direction or a rotation angle of the rotor; and identifying the machine type based on the torque direction information or the rotation angle information.

* * * * *

UNITED STATES PATENT AND TRADEMARK OFFICE
CERTIFICATE OF CORRECTION

| | | |
|---|---|---|
| PATENT NO. | : 9,673,739 B2 | |
| APPLICATION NO. | : 13/458136 | |
| DATED | : June 6, 2017 | |
| INVENTOR(S) | : Sjoerd Bosga et al. | |

It is certified that error appears in the above-identified patent and that said Letters Patent is hereby corrected as shown below:

On the Title Page

Column 1, (75) Inventors:
"Reza Moghaddam Rajabi, Vasteras (SE);"

Should read:
--Reza Rajabi Moghaddam, Vasteras (SE);--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*